UNITED STATES PATENT OFFICE.

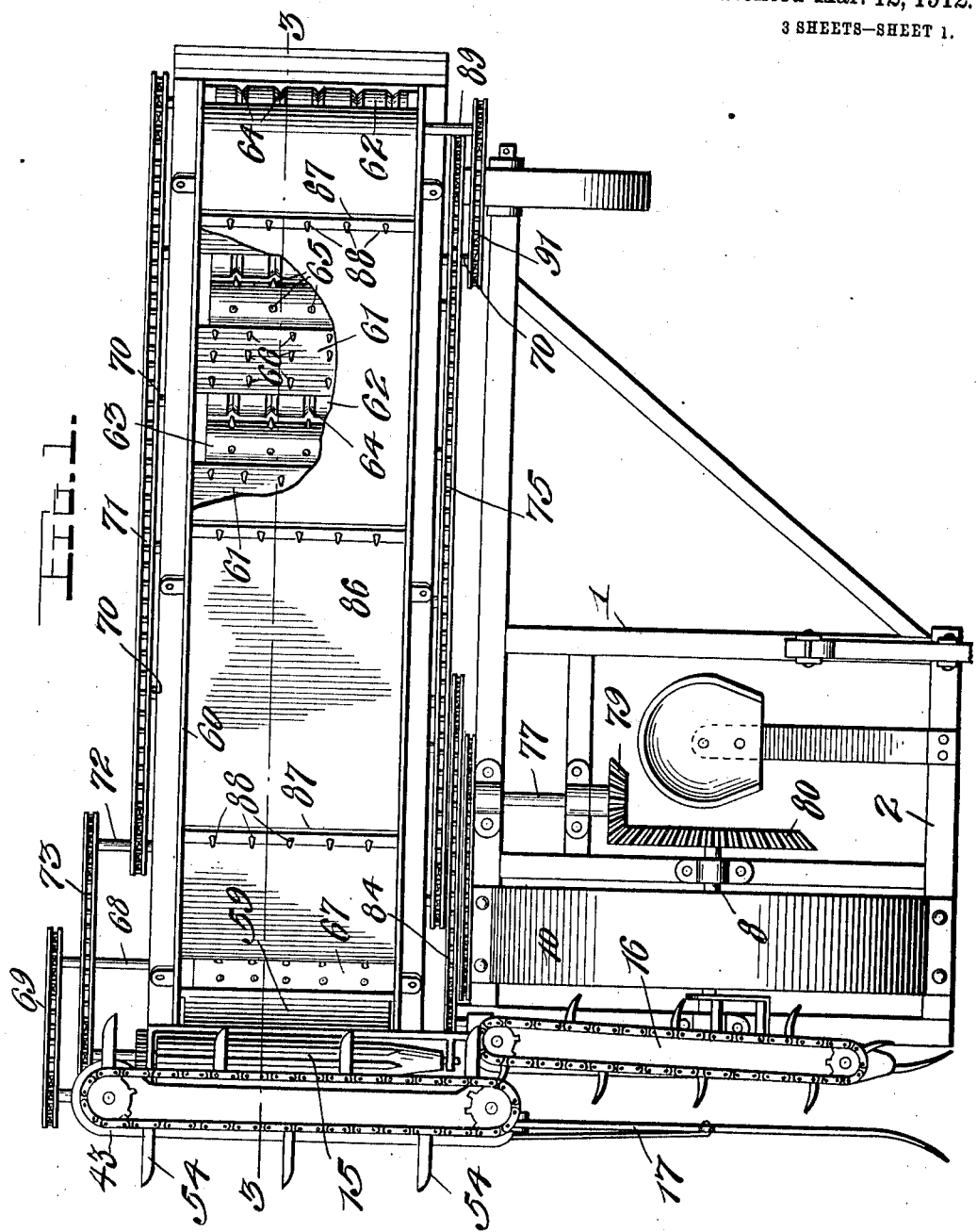

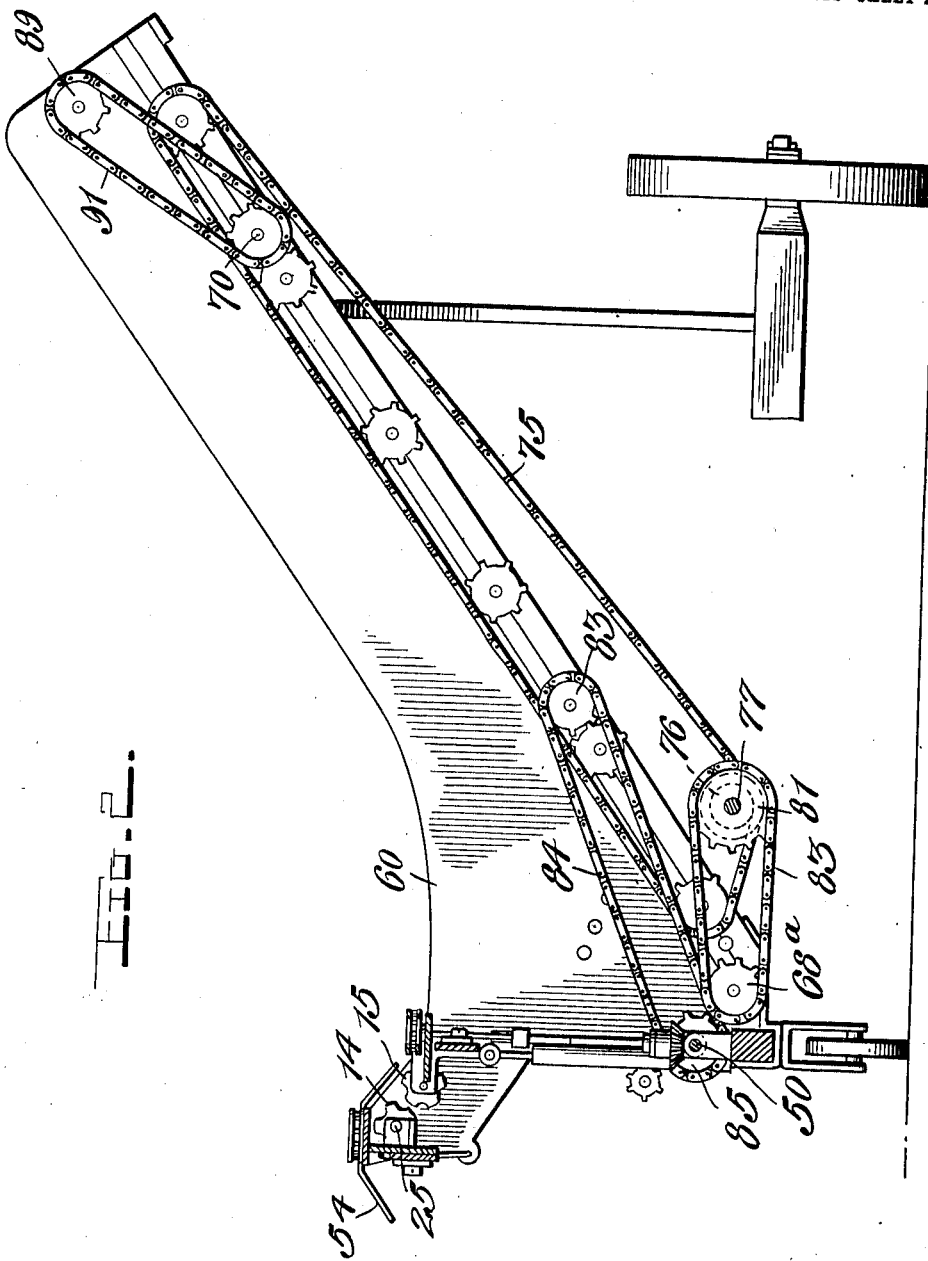

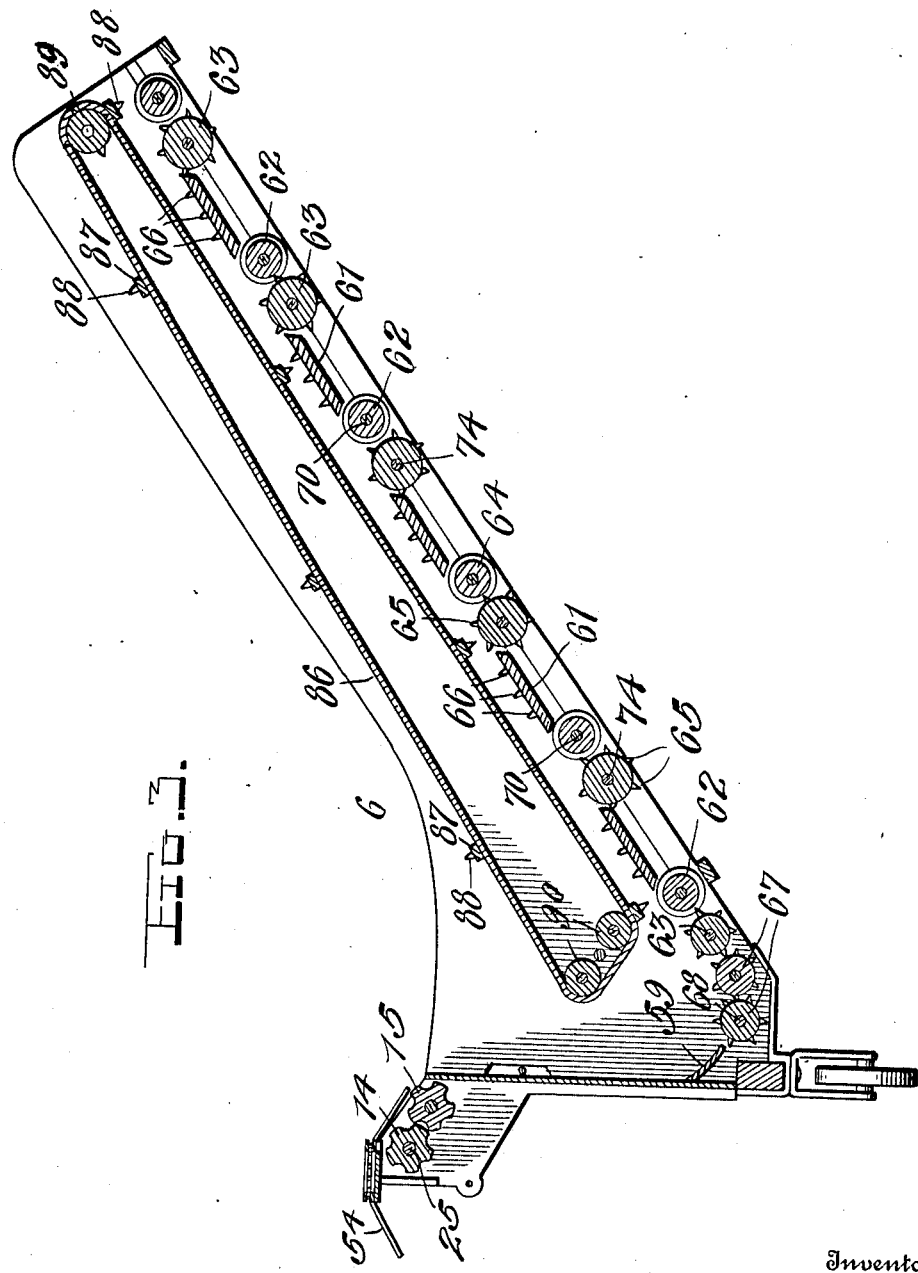

JAMES RICKEL, OF ST. JOSEPH, MISSOURI.

CORN-HUSKING MACHINE.

1,019,838.  Specification of Letters Patent.  Patented Mar. 12, 1912.

Application filed October 26, 1910. Serial No. 589,163.

*To all whom it may concern:*

Be it known that I, JAMES RICKEL, a citizen of the United States, residing at St. Joseph, in the county of Buchanan and State of Missouri, have invented certain new and useful Improvements in Corn-Husking Machines, of which the following is a specification, reference being had to the accompanying drawings.

This invention is an improved corn husking and elevating mechanism especially adapted for use in connection with a corn harvesting machine for husking the ears of corn which are snapped from the stalks and carrying the ears upwardly and husking the same while delivering the ears to a suitable receptacle, the invention consisting in the construction, combination and arrangement of devices, hereinafter described and claimed.

In the accompanying drawings—Figure 1 is a plan of a husking mechanism constructed in accordance with my invention and showing the same in connection with a corn harvesting mechanism for snapping the ears of corn from the stalks. Fig. 2 is a vertical longitudinal sectional view. Fig. 3 is partly an elevation and partly a section on the plane indicated by the line *a—a* of Fig. 1.

The main frame is indicated at 1, the gathering arms at 16, 17, the snapping rollers at 14, 15 and the endless feeders which direct the stalks to the snapping rollers are indicated at 43, 54. The ground and driving wheel 10, the shaft of which is indicated at 8, has its bearings in the front portion 2 of the main frame, is provided on its shaft with a beveled gear 80, which engages a similar gear 79 on the shaft 77. Said shaft 77 has at its rear end a sprocket gear 76, and also a sprocket gear 81. The main frame of the machine has a hopper 59 into which the ears of corn are dropped from the snapping rollers, and from one side of the said hopper extends an inclined conveyer trunk or frame 60. In the bottom of the hopper are a pair of husking rollers 67 68 which are provided with peripheral spurs. At the front end of the shaft of the roller 68 is a sprocket gear 68ᵃ which is connected to the gear 81 by the endless sprocket chain 82.

The bottom of the conveyer trough or elevator trough 60 is formed by a plurality of stationary transversely extending plates 61 between which are arranged pairs of coacting cylindrical rollers 62, 63. The rollers 62 have annular grooves 64, while the rollers 63 have spurs or teeth 65. If desired, spurs or teeth 66, may be as here shown, provided on the upper faces of the bottom plates 61. The rollers 67, 68 are adjacent the lowermost pair of the husking rollers 62, 63. The shaft 68 of the rollers 67 has upon its rear end a sprocket wheel which is connected by a sprocket chain 69 to a sprocket wheel upon the rear end of a shaft 25, which shaft 25 is driven by suitable means. The rear ends of the shafts 70 of the grooved rollers 62 are provided with sprocket wheels which are driven simultaneously in the same direction by a sprocket chain 71, and the grooved roller of the lowest pair has the rear end of its shaft extended as shown at 72 in Fig. 1, and provided with a sprocket wheel which is connected by a sprocket chain 73 to a sprocket wheel upon the rear end of the snapping roller shaft 26.

The front ends of the shafts 74 of the toothed husking roller 63 are provided with sprocket wheels which are connected together for simultaneous movement in the same direction, by a sprocket chain 75 which also passes around the sprocket wheel 76 as hereinbefore described. Also fixed to the forward end of the shaft 70 of the grooved husking rollers is a sprocket wheel 83 which is connected by a sprocket chain 84 to a sprocket wheel 85 fixed to the rear end of the shaft 50. It will be understood from the foregoing that the power from the wheel 10 will be communicated to the husking rollers and also the snapping rollers, and the feed chains.

The ears of corn are caused to travel up through the trough 60, and over the husking rollers by a flexible belt or apron 86 which is provided with transverse slats 87, said slats being provided with spurs 88. The said belt passes over an upper driving roller 89, and over two lower guide rollers 90. The driving roller 89 has the front end of its shaft extended, and provided with a sprocket wheel which is connected by a sprocket chain 91, to the shaft 70, of one of the grooved husking rollers 64. Hence the apron 86 is driven so that its lower stretch or lead travels upwardly and holds the ears of corn down upon the husking rollers which rotate in opposite directions, and also moves the ears of corn upwardly on the bottom of the conveyer or elevator trough, formed by the bottom plates and the husking rollers so that when the surfaces of the ears are presented as the same move upwardly on the bottom of the said trough or conveyer to the action of the successive pairs of husking rollers, with the result that before the ears reach the upper end of the said trough, from which they are discharged, they are entirely husked by the action of the husking rollers. The spurs 66 with which the said plates are provided coact with the said apron in thus turning the ears so as to present new surfaces thereof to the action of the husking rollers.

While I have herein shown and described in detail the preferred embodiment of my invention, I would have it understood that I am not limited to the precise construction set forth, and that various changes in the form, proportion, and arrangement of parts, and in the details of construction, may be resorted to without departing from the spirit and scope of my invention. I would also have it understood that while the improved husking mechanism, constituting my present invention has been here shown and described, as in connection with my improved corn harvesting mechanism, the husking mechanism may be employed independently of, and not in connection with the harvesting mechanism.

I claim:—

1. A husking machine comprising a longitudinally extended inclined conveyer trough, fixed spaced bottom plates extending transversely thereof, a series of pairs of husking rollers in the spaces between the bottom plates and disposed parallel with said bottom plates, means for moving ears of corn longitudinally and upwardly through the trough and over the said bottom plates and said pairs of husking rollers, and comprising an endless apron and means to actuate the same, the said bottom plates and the said endless apron having spurs on their opposing sides and the lower lead of the endless apron being arranged above the husking rollers and the plates and to travel across the same toward the upper end of the trough and cause the rotation of the ears of corn on the bottom plates between the pairs of husking rollers and also cause the husked ears to be discharged from the upper end of the trough.

2. A husking machine comprising a hopper, husking rollers in the bottom of the hopper, a conveyer trough extending upwardly and downwardly from the hopper, fixed spaced bottom plates in the conveyer trough, extending across the same, a series of pairs of husking rollers in the space between the bottom plates and disposed parallel therewith, an endless apron extending longitudinally of the trough and means to support and to drive the endless apron so that the lower lead thereof travels upwardly through the trough and over and across the bottom plates and the pairs of husking rollers, said endless apron and said bottom plates having spurs on their opposing sides to cause the rotation of ears of corn on the bottom plates between the pairs of husking rollers and also to cause the husked ears to be discharged from the upper end of the trough.

In testimony whereof I hereunto affix my signature in the presence of two witnesses.

JAMES RICKEL.

Witnesses:
LOUIE COMBS,
J. F. REORDON.

---

Copies of this patent may be obtained for five cents each, by addressing the "Commissioner of Patents, Washington, D. C."